(12) United States Patent
Bensch et al.

(10) Patent No.: US 8,197,014 B2
(45) Date of Patent: Jun. 12, 2012

(54) BRAKE SYSTEM FOR A VEHICLE

(75) Inventors: Uwe Bensch, Hannover (DE); Jörg Helmer, Vogt (DE); Bernd-Joachim Kiel, Wunstorf (DE); Hartmut Rosendahl, Hannover (DE); Otmar Struwe, Hannover (DE)

(73) Assignee: WABCO GmbH, Hannover (DE)

( * ) Notice: Subject to any disclaimer, the term of this patent is extended or adjusted under 35 U.S.C. 154(b) by 631 days.

(21) Appl. No.: 12/310,469

(22) PCT Filed: Jul. 4, 2007

(86) PCT No.: PCT/EP2007/005909
§ 371 (c)(1),
(2), (4) Date: Feb. 24, 2009

(87) PCT Pub. No.: WO2008/025399
PCT Pub. Date: Mar. 6, 2008

(65) Prior Publication Data
US 2009/0256416 A1    Oct. 15, 2009

(30) Foreign Application Priority Data
Aug. 31, 2006 (DE) .......................... 10 2006 041 009

(51) Int. Cl.
*B60T 13/00* (2006.01)
(52) U.S. Cl. ...................................... 303/9.66; 303/22.7
(58) Field of Classification Search .................. 303/3, 7, 303/8, 9.66, 22.5, 22.6, 22.7, 22.8
See application file for complete search history.

(56) References Cited

U.S. PATENT DOCUMENTS
2003/0006644 A1    1/2003    MacGregor et al.
2005/0029859 A1    2/2005    Bensch et al.

FOREIGN PATENT DOCUMENTS
| DE | 102 51 249 A1 | 12/2003 |
|---|---|---|
| DE | 103 36 611 A1 | 3/2005 |
| EP | 0 541 957 A1 | 5/1993 |
| EP | 0 995 659 A1 | 4/2000 |
| GB | 2 349 675 A | 11/2000 |
| GB | 2 349 676 A | 11/2000 |

*Primary Examiner* — Xuan Lan Nguyen
(74) *Attorney, Agent, or Firm* — Kramer Levin Naftalis & Frankel LLP

(57) ABSTRACT

A brake system for a vehicle includes a parking brake with an air-quantity-boosting-valve device for aerating and deaerating at least one spring brake cylinder of the parking brake, at least one electrically actuatable control valve for controlling the air-quantity-boosting-valve device, an electrical control device electrically coupled to the electrically actuatable control valve for controlling the electrically actuatable control valve, and an electrical actuating device coupled to the control device for actuating the parking brake. In order to be able to resort to available series-produced components, the air-quantity-boosting-valve device, the control valve, the electrical control device and the actuating device are, in each case, embodied as autonomous components arranged spatially separate from one another.

12 Claims, 2 Drawing Sheets

BRAKE SYSTEM FOR A VEHICLE

FIELD OF THE INVENTION

The present invention generally relates to a brake system for a vehicle having a parking brake.

BACKGROUND OF THE INVENTION

A brake system of the general type under consideration is described in DE 10336611 A1. This known brake system is equipped not only with a service brake but also with a parking brake, in order that the vehicle can be parked with the brake engaged. Such a parking brake is also known as a handbrake.

Parking brakes are usually provided with spring-actuated brake cylinders, in which an actuator spring engages the brake, so that the vehicle is braked or held immobile. This parking brake is released by pressurizing the spring-actuated brake cylinders with compressed air, so that the actuator spring is compressed and, thus, the parking brake is released.

Such spring-actuated brake cylinders are usually designed as combination service-brake and spring-actuated brake cylinders. They therefore have a spring-actuator part and a service-brake part. Service braking is conventionally actuated via a brake pedal.

The compressed-air supply of the spring-actuator part for releasing the parking brake is achieved by means of an air-flow-boosting valve device, especially a relay valve. At its output the air-flow-boosting valve device delivers the same pressure that is present at its control input, but with a boosted air flow, which is drawn from a compressed-air reservoir tank.

The control input of the air-flow-boosting valve device is supplied with the control pressure via at least one control valve. This control valve is designed as an electrically actuatable control valve, wherein the switched condition of this valve is determined by an electrical control device. The control device, in turn, is electrically connected to an actuating device for actuation of the parking brake. This actuating device may be actuated by the driver of the vehicle. The driver is able to release or engage the parking brake by means of this actuating device.

In the brake system described in DE 10336611 A1, the control device is integrated in a parking-brake module, as is a valve module, in which the valves of the parking brake are structurally integrated. As a result, a compact parking-brake module is realized that can be integrated easily into existing air-brake systems. However, this integration requires special housing parts and modules that have to be specially developed.

SUMMARY OF THE INVENTION

Generally speaking, it is an object of the present invention to provide an improved brake system with reduced development time and effort.

In accordance with embodiments of the present invention, the air-flow-boosting-valve device, the control valve or valves, the electrical control device and the actuating device of the brake system are, in each case, embodied as autonomous, separate components arranged spatially separate from one another. Because of the stand-alone, separate design of the components, and because of the spatially separated arrangement of these components, it is possible to use conventional series parts without the need for special additional modules or components. By eliminating integration of the components in a module, an inexpensive, dispersed structure of the parking-brake device is achieved. Not only are the manufacturing costs reduced by the use of already available components, but the approval process for new brake systems is shortened.

Advantageously, a pressure sensor is additionally provided that is also designed as a stand-alone separate component and that is electrically connected to the electrical control device and disposed in a manner spatially separated from the other components. Preferably, the pressure sensor measures the pressure in a compressed-air reservoir tank for supplying the spring-actuated brake cylinder with compressed air, and, for this purpose, the control device is designed such that it compares the measured pressure value with an upper and/or lower pressure limit value. If the measured pressure is below the lower pressure limit value, the control valve is activated to control the air-flow-boosting valve device, such that the spring-actuated brake cylinder can be vented by the air-flow-boosting valve device. However, when the measured pressure does not exceed an upper pressure limit value, the control valve cannot be activated, and air cannot be admitted to the spring-actuated brake cylinder by means of the air-flow-boosting valve device.

If the pressure in the compressed-air reservoir tank (or tanks) falls below a minimum value, automatic venting of the spring-actuated brake cylinder is advantageously effected, and the parking brake is applied. In contrast, when the upper limit value of the pressure is not yet reached in the compressed-air reservoir tank, it is possible to prevent the spring actuators from being released. In this way, it is ensured that a minimum pressure is always provided in the compressed-air reservoir tank before the parking brake can be released.

In another embodiment of the present invention, the electrical actuating device is provided with one or two electrical switches for selective setting of a released condition or engaged condition, respectively, of the parking brake. One switch is sufficient in vehicles operated without a trailer. In such cases, the parking brake can be engaged or released by means of the one switch. If the vehicle is a tractor of a vehicle train containing one or more trailers, however, it is advantageous to provide a second switch, by means of which the parking brake(s) of the trailer(s) can be controlled.

In a further embodiment, the electrical actuating device is also provided with a further operator-control element for activating an anti jackknifing brake function. When the anti jackknifing brake is activated, it brakes the rear wheels—that is, for example, the wheels of a trailer, especially a semi-trailer. This is advantageous when the vehicle or the vehicle train is traveling on a smooth roadway, since the anti-jackknifing brake keeps the vehicle train stretched out. By means of this additional operator-control element, the driver of the vehicle is also able to test whether a stationary trailer is actually being braked, by actuating this operator-control element and exerting a tractive force on the trailer by means of the tractor vehicle. Furthermore, by means of the anti jackknifing brake, the driver is able to check secure closing of the connection between tractor and trailer, especially semitrailer, or, in other words, the articulated coupling.

In a still further embodiment of the present invention, the control device is connected to one or more sensors for detecting operating conditions of vehicle components. For this purpose, the control device is designed such that it can engage or release the parking brake depending on the detected operating conditions. In this way, the spring-actuated brake cylinders can be selectively engaged or released by means of the electrical actuating device and, therefore, manually, or by means of an automatic external controller. Advantageously, at least one sensor for detection of the condition of the service brake is provided and connected to the control device. The control device prevents release of the parking brake if the service brake is not actuated. This makes it compulsory for the service brake to be actuated before the parking brake can be released. This is advantageous in preventing the vehicle from rolling away due to release of the parking brake.

Furthermore, a sensor for detecting the position of a vehicle door can be provided and connected to the electrical control device. The control device engages the parking brake or prevents release of the parking brake when the vehicle door is open. Such a function is particularly advantageous in a bus, for example. This function ensures that the bus cannot be moved if one of the doors is open.

In another embodiment of the present invention, the control device is integrated into the control device of an anti-lock braking system. In this way an additional control device can be dispensed with, leading to savings and to simplified assembly of the components of the parking brake. Alternatively, the control device can also be designed as a separate control device for the parking brake.

In yet another embodiment, an overload-protection valve is connected upstream from the control input of the air-flow-boosting valve device. The overload-protection valve has a first input in communication with the control valve for control of the air-flow-boosting valve device. Also, the overload-protection valve has a second input in communication with the brake pedal of the service brake, and an output in communication with the control input of the air-flow-boosting valve device. By this overload-protection valve, it is possible to prevent mechanical overloading due to addition of the brake forces of the service brake and parking brake, since, if the service brake and the parking brake are actuated simultaneously, the pressure of the service brake raises the pressure of the parking brake and, in this way, also reduces the braking effect. Advantageously, the overload-protection valve is integrated together with the air-flow-boosting valve device in a common unit.

Still other objects and advantages of the present invention will in part be obvious and will in part be apparent from the specification.

The invention accordingly comprises the features of construction, combination of elements, and arrangement of parts that will be exemplified in the constructions hereinafter set forth, and the scope of the invention will be indicated in the claims.

BRIEF DESCRIPTION OF THE DRAWINGS

For a fuller understanding of the invention, reference is had to the following description taken in connection with the accompanying drawings in which.

DETAILED DESCRIPTION OF THE PREFERRED EMBODIMENTS

Figure 1:
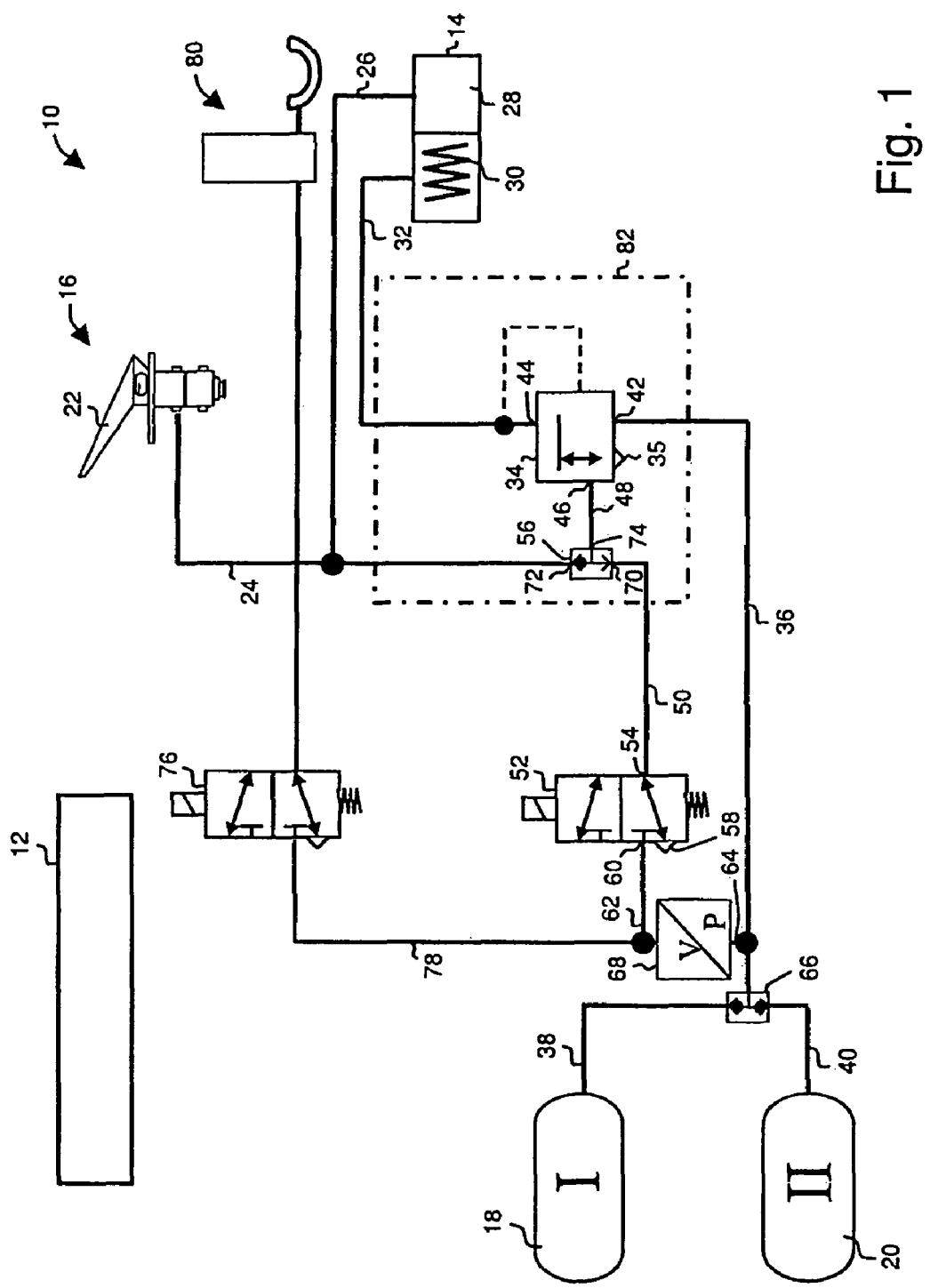
FIG. 1 is a simplified schematic view of an air-brake system having a parking brake and a service brake together with some essential components in accordance with an embodiment of the present invention.

Referring now to the drawing figures, FIG. 1 schematically depicts a part of an air-brake system 10 for a vehicle and, in particular, an electropneumatic brake-control device for control of a parking brake of the vehicle. Such air-brake systems are used, for example, in commercial vehicles, heavy motor trucks or buses, and, in particular, in vehicle trains comprising a tractor and a trailer.

FIG. 1 shows selected components of brake system 10. Brake system 10 is provided with an electrical control device 12 for control of certain of the components, especially of the parking brake. The brake cylinders are designed partly or completely as combination service and spring-actuated brake cylinders 14, although, for clarity, only one such brake cylinder is illustrated in FIG. 1. The term "spring-actuated brake cylinders" used herein in connection with the present invention should be understood to also encompass such combination service and spring-actuated brake cylinders.

Brake system 10 is provided with a brake-actuating device 16, which senses braking intent of the driver. Brake-actuating device 16 includes a pneumatic part and, possibly, an electrical part, only the pneumatic part being illustrated in FIG. 1. Via compressed-air lines (not illustrated), the pneumatic part is supplied with compressed air from a compressed-air reservoir tank 18 (circuit I) and another compressed-air reservoir tank 20 (circuit II). The compressed-air reservoir tanks 18, 20 are used to supply compressed air to the brake cylinders of the service brake, as will be described in greater detail hereinafter with reference to FIG. 2. As illustrated in FIG. 1, however, they may also be used to supply compressed air to the parking brake. Alternatively, the compressed air for the parking brake is supplied by a separate compressed-air reservoir tank, although this is not illustrated in the drawing figures.

By actuation of a brake pedal 22, brake-actuating device 16 generates—e.g., by electrical activation of electropneumatic devices or directly—a pneumatic manipulated variable that is relayed via a compressed-air line 24, 26 to combination service and spring-actuated brake cylinder 14.

Combination service and spring-actuated brake cylinder 14 is designed as a combination spring-actuator/diaphragm cylinder. Apart from the function of a diaphragm cylinder, it additionally has a spring-actuator function. Brake cylinder 14 therefore comprises a diaphragm part 28, which is in communication pneumatically with the service-brake system and can be pressurized with the actual brake pressure, and a spring-actuator part 30, which is pneumatically separated from diaphragm part 28 and can be pressurized with compressed air via a separate compressed-air line 32. Spring-actuator part 30 forms part of the parking brake. It includes the spring-actuator function, which preloads an actuator spring upon pressurization of spring-actuator part 30 and, thus, prevents or diminishes braking action of the spring-actuator function, whereas the actuator spring relaxes upon venting of spring-actuator part 30 and, thus, in connection with the spring-actuator function, exerts a braking action on the brake in communication with the respective brake cylinder. In the present context, brake cylinders of this type will be referred to as "spring-actuated brake cylinders".

By means of spring-actuated brake cylinder 14, a parking-brake function that also permits the vehicle to be braked or immobilized even in the absence of compressed air is achieved. The parking-brake function is active when the respective spring-actuator part 30 of spring-actuated brake cylinder 14 is vented below a minimum pressure value or is vented completely. Via compressed-air line 32, spring-actuator part 30 of brake cylinder 14 is pneumatically in communication with an air-flow-boosting valve device 34, which permits pressure control by way of electrical control means, especially, electrical control device 12.

A manually actuatable parking-brake signal transducer (not illustrated in FIG. 1) is electrically connected via electrical lines (not illustrated) to electrical control device 12. By means of this parking-brake signal transducer, the driver is able to activate the parking brake by admitting air to or venting spring-actuator part 30 by means of air-flow-boosting valve device 34. For venting, air-flow-boosting valve device 34 is provided with a vent output 35. The parking brake is released by admission of air to spring-actuator part 30. In contrast, the parking brake is engaged by venting of spring-actuator part 30.

Air-flow-boosting valve device 34 is preferably designed as a relay valve, and includes an inlet 42, which, via compressed-air lines 36, 38, 40, is in direct or indirect communication with compressed-air reservoir tanks 18, 20. Furthermore, air-flow-boosting valve device 34 has an outlet 44, which, via compressed-air line 32, is in communication with spring-actuator part 30 of brake cylinder 14. Air-flow-boosting valve device 34 also has a control input 46, which, via compressed-air lines 48, 50, is in communication with a control valve 52 for control of the parking brake of the tractor.

Control valve 52 is designed as a 3/2-way solenoid valve. This means that it has three ports and can assume two conditions. In the de-energized condition illustrated in FIG. 1, an outlet 54 of control valve 52 is in communication with compressed-air line 50, which, via an overload-protection valve 56 described in greater detail hereinafter and compressed-air line 48, is in communication with control input 46 of air-flow-boosting valve device 34. In the de-energized condition of control valve 52, outlet 54 is in communication with a vent 58. In the de-energized condition, therefore, control valve 52 ensures venting of control input 46 of air-flow-boosting valve device 34 and, thus, also venting of spring-actuator part 30 of brake cylinder 14. The parking brake is engaged as a result of this venting.

Control valve 52 further has an inlet 60, which, via compressed-air lines 62, 64 as well as compressed-air lines 36, 38 and 40, is in communication with compressed-air reservoir tanks 18 and 20. In the energized condition of control valve 52, inlet 60 is in communication with outlet 54, whereby the reservoir pressure, and, by virtue of a double check valve or what is known as a select-high valve 66 between compressed-air reservoir tanks 18, 20 and inlet 60 of control valve 52, the higher of the two reservoir pressures of compressed-air reservoir tanks 18, 20 is transmitted via compressed-air lines 50, 48 to control input 46 of air-flow-boosting valve device 34. Thereupon, air-flow-boosting valve device 34 modulates, at its output 44, the same pressure as is present at its control input 46, such that air-flow-boosting valve device 34 delivers, at its outlet 44, an air flow boosted by a multiple compared with that needed at control input 46. For this purpose, inlet 42 of air-flow-boosting valve device 34 is placed in communication with compressed-air reservoir tanks 18, 20. This modulated pressure at outlet 44 of air-flow-boosting valve device 34 is supplied via compressed-air line 32 to spring-actuator part 30 of brake cylinder 14, causing air to be admitted to spring-actuator part 30 and the parking brake to be released.

A pressure sensor 68 is connected between double check valve 66 and inlet 42 of air-flow-boosting valve device 34 or inlet 60 of control valve 52 to ensure that the order of magnitude of the reservoir pressure momentarily available can be sensed. This pressure sensor transmits a correspondingly measured pressure value via an electrical line (not illustrated) to electrical control device 12.

Via further electrical lines (not illustrated), electrical control device 12 is further connected to control valve 52, so that control valve 52 can change its condition depending on corresponding electrical signals of electrical control device 12.

Overload-protection valve 56 has two inputs 70, 72 and one output 74. A first input 70 is in communication with outlet 54 of control valve 52. A second input 72 is in communication via compressed-air line 24 with brake pedal 22 or the pneumatic part thereof. Output 74 of overload-protection valve 56 is in communication via compressed-air line 48 with control input 46 of air-flow-boosting valve device 34.

Overload-protection valve 56 selects the higher of the two pressures present at its inputs 70, 72 and supplies this to control input 46 of air-flow-boosting valve device 34. It is therefore also referred to as a "select-high valve".

Overload-protection valve 56 prevents addition of the brake force supplied to brake cylinder 14 by the service brake, or, in other words, via the pneumatic part of brake pedal 16, and the brake force supplied to spring-actuator part 30 by the parking brake via compressed-air lines 32, 36, 38, 40, thus, preventing mechanical overloading of the brake mechanism in the wheel brake associated with brake cylinder 14. By virtue of the illustrated structure, the brake force supplied via compressed-air lines 24, 26 to diaphragm part 28 of brake cylinder 34 is not increased by the brake force exerted by the actuator spring, since, in the case of actuation of the service brake, the brake force exerted by the actuator spring is reduced by a force corresponding to actuation of the service brake. In this way, critical overloading of the wheel brakes can be avoided.

The components discussed above relate to the brake device of the tractor. If a trailer can be coupled to the tractor, compressed-air brake system 10 is additionally provided with a second control valve 76, which, via a compressed air line 78, is also in communication with compressed-air reservoir tanks 18, 20. Control valve 76 is disposed in parallel with control valve 52. Otherwise, it is designed to be functionally identical to control valve 52, and, so, in this regard, the foregoing discussion of control valve 52 and of its ports and switched conditions can be consulted. Only the output of control valve 76 is in communication with one other component, namely a tractor-truck protection valve 80.

In the exemplary embodiment depicted in FIG. 1, overload-protection valve 56 is integrated in a common valve unit 82 together with air-flow-boosting valve device 34.

By means of pressure sensor 68, the controller provided in the electrical control device senses the higher of the two reservoir pressures of compressed-air reservoir tanks 18, 20. The pressure sensed in this way as well as the switch condition or conditions of the actuating device (not illustrated) for the parking brake of the tractor and, possibly, of the trailer, are read in and evaluated by electrical control device 12. Depending on the result of the logical combinations or of the programmed control, control valves 52, 76 for the parking brake of the tractor or of the trailer are then switched. If the control valves are switched, or, in other words, are energized, air can be admitted to air-flow-boosting valve device 34 or a corresponding valve device 34 in the trailer and, thus, to spring-actuator part 30 or a corresponding spring-actuator part of a spring-actuated brake cylinder of the trailer, with the result that the parking brake of the tractor or of the trailer is released. In contrast, if control valves 52, 76 are switched to de-energized condition, air-flow-boosting valve device 34 or the corresponding valve device of the trailer switches to venting. The spring-actuator parts of the spring-actuated brake cylinders are then vented and, thus, the parking brake is engaged.

Figure 2:
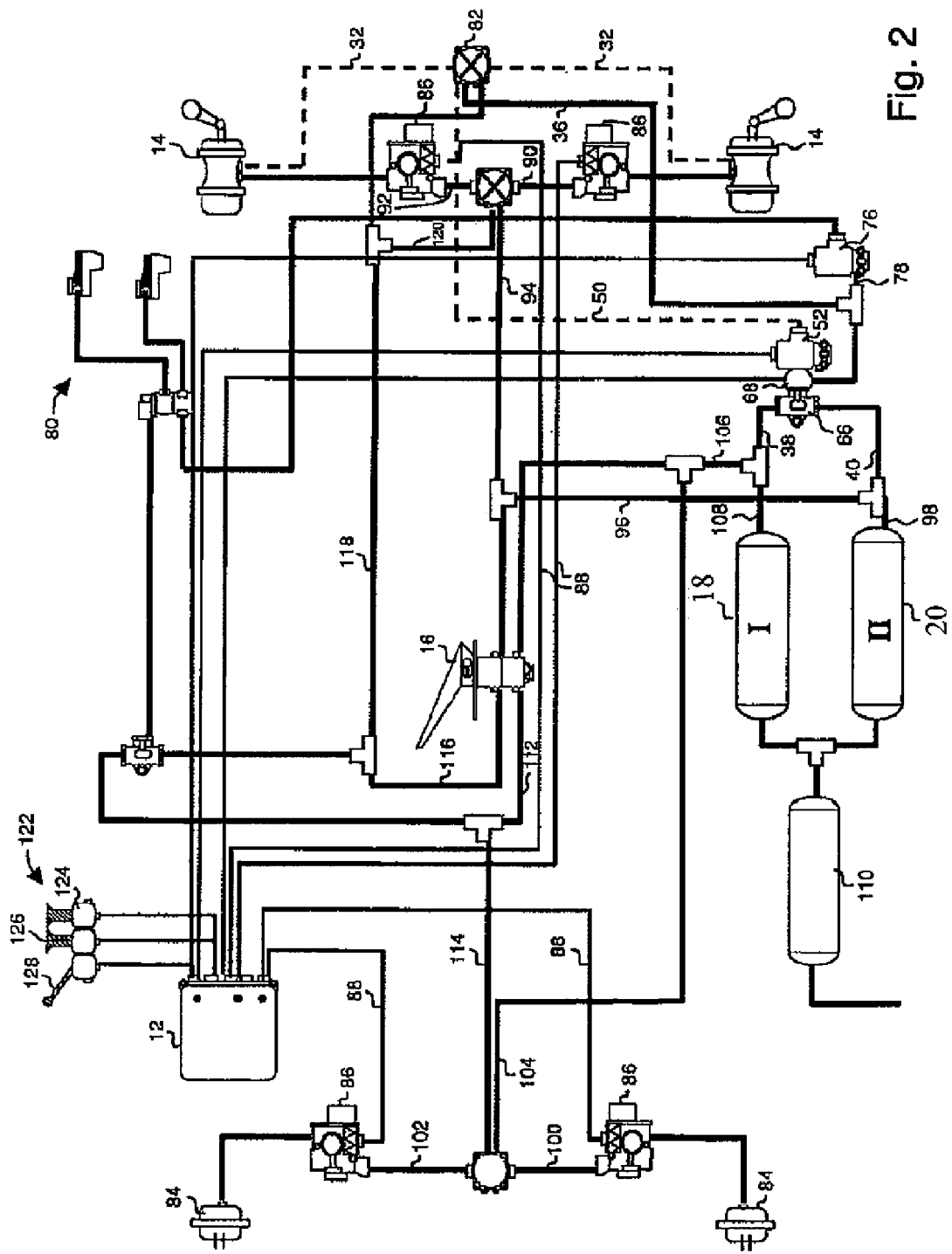
FIG. 2 shows an air-brake system in accordance with an embodiment of the present invention having the components shown in FIG. 1 as well as further brake system components.

FIG. 2 depicts the subsystem of brake system 10 illustrated in FIG. 1 in a broader context, specifically, for vehicles having four wheels that can be individually braked by means of compressed-air brake cylinders 14, 84. Brake cylinders 14 are provided for the rear axle and brake cylinders 84 for the front axle. As discussed in connection with FIG. 1, brake cylinders 14 are designed as combination service brake/spring-actuated brake cylinders, in order to permit braking by means of the service brake and also braking by means of the parking brake. Electrically actuatable valves 86 are connected upstream from brake cylinders 14, 84, respectively. Valves 86 are connected via electrical lines 88 to electrical control device 12. Furthermore, valves 86 of the rear axle are in communication via compressed-air lines 90, 92, 94, 96, 98 with compressed-air reservoir tank 20, and they form circuit II. Analogously, valves 86 of the front axle are in communication via compressed-air lines 100, 102, 104, 106, 108 with compressed-air reservoir tank 18, and, in this way, they form circuit I. The two compressed-air reservoir tanks 18, 20 are supplied with compressed air via a compressed-air supply 110 and especially via a compressor.

In the illustrated exemplary embodiment, brake-actuating device 16 is in communication by means of pneumatic lines, namely, compressed-air lines 112, 114, and then further via compressed-air lines 100, 102, with valves 86 for compressed-air brake cylinders 84 of the front axle, in order to provide a pneumatically operated service brake. Analogously, brake-actuating device 16 is in communication, via compressed-air lines 116, 118, 120, and as compressed-air lines 90, 92, with valves 86 of combination service and spring-actuated brake cylinders 14, in order that the rear axle can also be braked pneumatically.

The further components shown in FIG. 1, especially, valve unit 82 comprising air-flow-boosting valve device 34 as well as overload-protection valve 56, and control valves 52, 76 as well as pressure sensor 68, are also illustrated in FIG. 2. Regarding these components, the discussion above in connection with FIG. 1 can be consulted.

FIG. 2 further shows electrical actuating device 122 for actuating the parking brake. Actuating device 122 is provided with a first switch 124 for actuation of the parking brake of the tractor as well as with a second switch 126 for actuating the parking brake of the trailer. Each of the two switches has a released position and an engaged position and, possibly, a neutral position, for releasing or engaging the parking brake. Furthermore, in a special embodiment for vehicles with trailers, an additional electrical operator-control element 128 is provided, so that the anti jackknifing function discussed above can be effected.

Electrical actuating device 122 is disposed in the driver's cab of the vehicle. Thus, there is no need to provide pneumatic switches for actuating the parking brake in the driver's cab, and tubing comprising compressed-air lines for the parking brake can be avoided in the driver's cab, but the parking brake can nonetheless be actuated.

The essential components of the parking brake, especially, air-flow-boosting valve device 34, control valves 52, 76, pressure sensor 68, electrical control device 12 and actuating device 122, are each designed as stand-alone, separate components that can be disposed in a manner spatially separated from one another. By virtue of this dispersed structure without integration of these components in one module, it is possible, according to the present invention, to use already available series parts. This simplifies not only the engineering design but also the approval procedures for such brake systems.

It will thus be seen that the objects set forth above, among those made apparent from the preceding description, are efficiently attained, and since certain changes may be made without departing from the spirit and scope of the invention, it is intended that all matter contained in the above description or shown in the accompanying drawings shall be interpreted as illustrative and not in a limiting sense.

It is also to be understood that the following claims are intended to cover all of the generic and specific features of the invention herein described and all statements of the scope of the invention that, as a matter of language, might be said to fall therebetween.

LIST OF REFERENCE NUMERALS

10 Air-brake system
12 Electrical control device
14 Brake cylinder
16 Brake-actuating device
18 Compressed-air reservoir tank
20 Compressed-air reservoir tank
22 Brake pedal
24 Compressed-air line
26 Compressed-air line
28 Diaphragm part
30 Spring-actuator part
32 Compressed-air line
34 Air-flow-boosting valve device
35 Vent output
36 Compressed-air line
38 Compressed-air line
40 Compressed-air line
42 Inlet
44 Outlet
46 Control input
48 Compressed-air line
50 Compressed-air line
52 Control valve
54 Outlet
56 Overload-protection valve
58 Vent
60 Inlet
62 Compressed-air line
64 Compressed-air line
66 Double check valve
68 Pressure sensor
70 Input
72 Input
74 Output
76 Control valve
78 Compressed-air line
80 Tractor-truck protection valve
82 Valve unit
84 Brake cylinder
86 Valves
88 Electrical line
90 Compressed-air line
92 Compressed-air line
94 Compressed-air line
96 Compressed-air line
98 Compressed-air line
100 Compressed-air line
102 Compressed-air line
104 Compressed-air line
106 Compressed-air line
108 Compressed-air line
110 Compressed-air supply
112 Compressed-air line
114 Compressed-air line
116 Compressed-air line
118 Compressed-air line
120 Compressed-air line 122 Electrical actuating device
124 Switch
126 Switch
128 Operator-control element

The invention claimed is:

1. A vehicle brake system, comprising a parking brake, an air-flow-boosting valve device operable to admit air into and to vent air from at least one spring-actuated brake cylinder of said parking brake, at least one electrically actuatable control valve operable to control said air-flow-boosting valve device, an electrical control device in electrical communication with said electrically actuatable control valve configured to control said electrically actuatable control valve, at least one compressed-air reservoir tank for supplying said spring-actuated brake cylinder with compressed air, a pressure sensor in communication with said control device, and an electrical actuating device in electrical communication with said control device configured to actuate said parking brake, each of said air-flow-boosting valve device, said control valve, said electrical control device and said electrical actuating device being a stand-alone component spatially separated from one another, said pressure sensor being configured to measure pressure in said at least one compressed-air reservoir tank and compare said measured pressure with each of a lower pressure limit value and an upper pressure limit value, and said control device being configured to prevent actuation of said control valve to prevent air from being admitted into said spring-actuated brake cylinder by means of said air-flow-boosting valve device when said measured pressure does not exceed said upper pressure limit value.

2. The brake system according to claim 1, wherein said pressure sensor is a stand-alone component spatially separated from each of said air-flow-boosting valve device, said control valve, said electrical control device and said electrical actuating device.

3. The brake system according to claim 2, wherein said control device is configured to actuate said control valve to effect venting of said spring-actuated brake cylinder by means of said air-flow-boosting valve device when said measured pressure is below said lower pressure limit value.

4. The brake system according to claim 1, wherein said electrical actuating device includes at least one electrical switch for setting a released condition and an engaged condition of said parking brake.

5. The brake system according to claim 1, wherein said electrical actuating device further includes an operator-control element for activating an anti-jackknifing brake function.

6. The brake system according to claim 1, wherein said control device is in communication with at least one sensor for detecting operating conditions of vehicle components, said control device being operable to one of automatically engage and release said parking brake based on said operating conditions.

7. The brake system according to claim 6, wherein said at least one sensor is operable to detect a condition of a service brake of said vehicle, and said control device is operable to prevent release of said parking brake when said service brake is not actuated.

8. The brake system according to claim 6, wherein said at least one sensor is operable to detect a position of a vehicle door, and said control device is operable to at least one of effect engagement of said parking brake and prevent release of said parking brake when said vehicle door is open.

9. The brake system according to claim 1, wherein said control device is a part of an anti-lock braking system.

10. The brake system according to claim 1, further comprising an overload-protection valve connected upstream from a control input of said air-flow-boosting valve device, said overload-protection valve including a first input in pneumatic communication with said electrically actuatable control valve, a second input in pneumatic communication with a brake-actuating device of a service brake of said vehicle, and an output in pneumatic communication with said control input of said air-flow-boosting valve device.

11. The brake system according to claim 10, wherein said air-flow-boosting valve device and said overload-protection valve are integrated in a common unit.

12. The brake system according to claim 1, wherein said pressure sensor is pneumatically coupled to a double check valve and said air-flow-boosting valve device.

* * * * *